US012733621B2

(12) United States Patent
Kershman et al.

(10) Patent No.: US 12,733,621 B2
(45) Date of Patent: Sep. 15, 2026

(54) CAT LITTER CONTAINING A FLUORESCENT CAT ATTRACTANT

(71) Applicant: Boxiecat LLC, Santa Monica, CA (US)

(72) Inventors: Alvin Kershman, St. Louis, MO (US); Jeff Shear, Bonita Springs, FL (US); Doreen Linze, Labadie, MO (US); William Lewis, Pacific, MO (US)

(73) Assignee: Boxiecat LLC, Santa Monica, CA (US)

( * ) Notice: Subject to any disclaimer, the term of this patent is extended or adjusted under 35 U.S.C. 154(b) by 461 days.

(21) Appl. No.: 18/468,507

(22) Filed: Sep. 15, 2023

(65) Prior Publication Data

US 2024/0090471 A1 Mar. 21, 2024

Related U.S. Application Data

(60) Provisional application No. 63/406,785, filed on Sep. 15, 2022.

(51) Int. Cl.

*A01K 1/015* (2006.01)
*B01J 20/28* (2006.01)
*B01J 20/32* (2006.01)

(52) U.S. Cl.

CPC .......... *A01K 1/0154* (2013.01); *A01K 1/0155* (2013.01); *B01J 20/28016* (2013.01); *B01J 20/2803* (2013.01); *B01J 20/3204* (2013.01); *B01J 20/3289* (2013.01); *B01J 20/3293* (2013.01); *B01J 20/28011* (2013.01)

(58) Field of Classification Search

CPC ................ B01J 20/2816; B01J 20/2803; B01J 20/3204; B01J 20/3042; B01J 20/3028; B01J 20/10; B01J 20/103; B01J 20/12; B01J 20/262; B01J 20/3289; B01J 20/2385; B01J 20/3274; B01J 20/3285; B01J 20/3293; B01J 41/16; B01J 41/04; B01J 41/05; B01J 41/07; A01K 1/0152; A01K 1/0154; A01K 1/0155

See application file for complete search history.

(56) References Cited

U.S. PATENT DOCUMENTS 5,267,532 A * 12/1993 Franklin .............. A01K 1/0155 436/163
6,019,062 A * 2/2000 Lombard ............ A01K 1/0152 119/172
7,665,418 B2 * 2/2010 Bracilovic ........... A01K 1/0155 119/173
2004/0112297 A1 * 6/2004 Rasner ................. A01K 1/0154 119/172
2007/0065397 A1 * 3/2007 Ito ............................ A61L 9/01 424/76.2
2007/0179079 A1 * 8/2007 Kilkenny ............. C11D 3/3776 510/499
2010/0264369 A1 * 10/2010 Zhang ..................... A61L 15/56 252/301.35
2012/0202236 A1 * 8/2012 Jollez ................... A01K 1/0155 435/28
2013/0319341 A1 * 12/2013 Zhang .................. A01K 1/0152 119/173
2015/0273523 A1 * 10/2015 Ikegami ..................... B01J 2/04 427/215
2017/0359967 A1 * 12/2017 Tetrault .................... A41D 1/06

FOREIGN PATENT DOCUMENTS

CA 3230828 A1 * 3/2023 ......... A61F 13/2051
CN 109310983 A * 2/2019 ........ B01J 20/28016
CN 110583496 A * 12/2019 ........... A01K 1/0155
CN 114617069 A * 6/2022 ............. G01N 21/78
DE 102004008018 A1 * 2/2005 .............. B01J 20/12
EP 1588759 A2 * 10/2005 ........... A01K 1/0154
JP 2004147611 A * 5/2004
JP 3638534 B2 * 4/2005
JP 3740457 * 2/2006 ............. A01K 1/015
WO WO-2006042617 A2 * 4/2006 ........... A01K 1/0152
WO WO-2016049765 A1 * 4/2016 ................ C08L 1/04

OTHER PUBLICATIONS

Machine translation of WO-2006042617 (Year: 2006).*
Machine translation of CN-110583496 (Year: 2019).*
Machine translation of CN-114617069 (Year: 2022).*
Machine translation of DE-102004008018 (Year: 2005).*
Machine translation of EP-1588759 (Year: 2005).*
Machine translation of JP-3638534 (Year: 2005).*
Machine translation of JP-3740457 (Year: 2006).*
Machine translation of CN-109310983 (Year: 2019).*
Machine translation of JP-2004147611 (Year: 2004).*

* cited by examiner

*Primary Examiner* — Katherine Zalasky McDonald
(74) *Attorney, Agent, or Firm* — Linda L. Lewis

(57) ABSTRACT

A cat litter comprising an absorbent and at least one fluorescent compound, where the at least one fluorescent compound does not contain cat urine and wherein the at least one fluorescent compound attracts cats to eliminate in the litter. The cat litter comprising a solid particulate material coated with a cellulosic solution containing at least one fluorescent material.

20 Claims, No Drawings

CAT LITTER CONTAINING A FLUORESCENT CAT ATTRACTANT

CROSS-REFERENCE TO RELATED APPLICATIONS

This application claims the benefit of U.S. provisional patent application 63/406,785 filed Sep. 15, 2022, which is hereby incorporated by reference.

STATEMENT REGARDING FEDERALLY SPONSORED RESEARCH

Not Applicable.

APPENDIX

Not Applicable.

BACKGROUND OF THE INVENTION

Field of the Invention

The present disclosure relates generally to compositions, methods and devices that use fluorescent compounds to attract cats to eliminate in a litter box.

Related Art

Litter boxes are used by cats for elimination of urine and fecal matter. A litter box contains a layer of cat litter that receives the urine and fecal matter. The cat litter is granular and absorbent to facilitate formation of clumps after the urine and fecal matter is deposited in the cat litter. The clumps are typically sifted from the litter box using a litter scoop and then discarded.

House soiling, also known as inappropriate elimination or out-of-box elimination ("OOB"), is a significant behavioral issue for pet owners. The soiling of the house can become intolerable for the pet owner and undermine the human-pet bond. Frequently, the situation results in the relinquishment of the cat to a shelter. Shelters know that finding homes for cats with OOB issues is difficult, and such cats are often euthanized. In this regard, OOB elimination behaviors actually lead to the death of more cats than any other behavioral issue and many feline diseases.

Traditional treatments for house soiling include: changing the litter daily, adding more litter boxes, ceasing punishment of the cat, and spaying or neutering the cat. Owners note minimal success employing these treatments.

Attractants are added to litter and used to attract cats to the litter for elimination purposes. These include pheromones, black currant oil, black seed oil, catnip, cat grass, chamomile, lavender, licorice, Matatabi, methalactone, 3-Mercapto-3-methylbutan-1-ol, musk oil, peppermint oil, pine oil, rosemary, vanillin, and white truffle oil. However, these attractants have limited success. Accordingly, there remains a need for an attractant to attract cats to the litter for elimination purposes.

Patent application WO2016/170475 relates to the use of L-Felinine, a cat pheromone precursor, to attract a cat to eliminate in a litter, which is hereby incorporated by reference. U.S. Patent publication US2021/0087161 discloses methods and uses of a composition comprising 2,2-dimethyl-1,3-dioxolane-4-methanol in pet litters, in particular for promoting in-litter elimination by pets, which is hereby incorporated by reference.

It has been reported that cats have the ability to see blues and ultraviolet (UV) light. They do not perceive red colors. Since many fluorescent compounds emit blue and UV light, it is likely that cats are attracted to fluorescent compounds. These compounds, when used in cat litter, could be used to attract the cat to the litter.

Neither of the above references disclose the claimed cat litter having a fluorescent component to attract a cat to eliminate in a litter.

SUMMARY OF THE INVENTION

The present invention is an improved cat litter which comprises at least one absorbent material and at least one fluorescent compound, wherein the at least one fluorescent compound attracts cats to eliminate in the litter. In a preferred embodiment, the at least one fluorescent compound is coated onto at least some or all of the absorbent material.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The claimed pet litter comprises at least one absorbent material and at least one fluorescent compound. The absorbent material can be any absorbent material or combination of absorbent materials commonly used in litters. Typically, the absorbent material is a dry, granular material. Preferably, said absorbent material is selected from the group consisting of clays, silica gels, woods (such as pine, aspen, cedar, fir, spruce), agricultural products, and combinations thereof. More preferably, said absorbent material is selected from the group consisting of clays, silica gels, and combinations thereof. In a particular embodiment, the absorbent material is clay, such as calcium or sodium montmorillonite (including sodium bentonite and calcium bentonite), smectite, ventriculite, attapulgite, opal clay and/or kaolin. The absorbent material, in particular clays, can be clumping and/or non-clumping.

The at least one fluorescent compound on the present invention must be a compound that is not harmful to cats or the environment. Fluorescent whitening agents, called optical brighteners, are fluorescent materials that can absorb UV light and emit visible (blue-violet). When exposed to white light, they can also emit UV light. Preferably, they are hydrophilic water-soluble compounds, and are mainly anionic diamino stilbene (DAS) or distyryl biphenyl (DSBP) derivatives displaying a low aquatic toxicity. The most common classes of compounds with this property are the stilbenes, e.g., 4,4'-diamino-2,2'-stilbenedisulfonic acid and 4-(2H-Naphtho[1,2-d]triazol-2-yl)-2-stilbenesulfonic Acid Sodium Salt. The compounds 4,4'-bis(benzoxazolyl)-cis-stilbene and 2,2'-(2,5-thiophenediyl)-bis(5-tert-butylbenzoxazole) are also intensely fluorescent and used as optical brighteners.

Optionally, the coating solution contains from about 0 to 5 wt. % glycerin.

The at least one fluorescent compounds of the present invention are not limited to optical brighteners. However, it is well know that cat urine is a fluorescent material, and cat urine is not included in the fluorescent compounds of the present invention.

In a preferred embodiment, the composition in the pet litter according to the invention is coated on at least a part of the absorbent material. For example, the composition can be sprayed onto at least a part of the absorbent material. Indeed, it has been observed that the effect is similar whatever the proportion of absorbent material coated with the composition. Preferably, the composition in the pet litter according to the invention is coated on at least 1% of the absorbent material. More preferably, the composition contains from 1 wt. % to 55 wt. % of the pet litter. Most preferably, the composition contains from about 2 wt. % to 20 wt. % of the pet litter. Typically the coated absorbent contains from about 0.01 to about 10.0 wt. % fluorescent material. More preferably, the amount of fluorescent material is from about 0.05 to 5.0 wt. % on the coated material. The amount of cellulose present in the coated absorbent is in the range of 0.01 to 10.0 wt. %.

In another embodiment, the litter comprises a solid particle material mixed with the absorbent material, the composition being coated onto a non-absorbent solid particle material. For example, the fluorescent composition can be sprayed onto a solid particle material such as sand, polymers, and plastics to coat particles, which are then mixed with the absorbent material.

Coatings can be applied a variety of ways, including dipping and spraying. One method of coating is using a fluidized bed. The fluidized bed is formed when a quantity of a solid particulate substance is placed under appropriate conditions to cause a solid/fluid mixture to behave as a fluid. This is usually achieved by the introduction of pressurized fluid through the particulate medium. This results in the medium then having many properties and characteristics of normal fluids, such as the ability to free-flow under gravity, or to be pumped using fluid type technologies.

In one embodiment, the coating can be applied as a dry coating. A dry powder fluorescent material can be applied to a solid particulate material which has been wetted, or which is in a sticky state so as to adhere to the solid particulate material. This method includes the use of a commercial coating tumbler that rotates, tumbles, vibrates and/or otherwise agitates particles therein within that the outer surface of the particles are still sticky facilitating adherence of the powdered coating formulation to each particle. In a preferred method, the dry powder is applied to the solid particulate material after the material is wetted with an aqueous solution containing a cellulose ether, which acts as glue to hold the dry powder to the particle In a preferred embodiment, the dry powder is applied to an absorbent material, such as cat litter. The cat litter must be wetted in a manner that facilitates coating with the dry powder, but does not cause clumping of the cat litter. The coating of the particle should be complete, without significant gaps in the coating. Additionally, it is desirable to have the coating adhere after the cat litter is dried, and not flake off. Further, the coated litter must be similar in shape and density, to not cause segregation of the coated litter from the uncoated litter.

In one preferred method of applying a coating, the coating formulation is applied using a liquid, such as water, and a pressurized gas, such as pressurized air, which not only helps vaporize or mist the coating formulation containing liquid but also helps agitate or move around the particles in a drum, container or enclosure, such as a commercial coating tumbler, which are being coated. In such a preferred method of applying a coating formulation onto uncoated particles, the fluorescent material is mixed with a liquid, e.g., water, which can be sprayed from a nozzle together with compressed air into an enclosure, such as a drum or other container, which contains particles helping to agitate the particles and coat the particles with a minimum of disturbance or damage to the particles during coating. The drum or container in which the particles are disposed during such a coating step preferably is rotated, vibrated or otherwise agitated to help facilitate coating each particle.

The at least one fluorescent material can preferably be liquid coated onto the particles using cellulose ethers solutions or slurries to adhere the coating to the particle. Preferably, the cellulose ether is a water soluble cellulose ether. Nonlimiting examples of water soluble cellulose ethers include carboxy-$C_1$-$C_3$-alkyl celluloses, such as carboxymethyl celluloses; carboxy-$C_1$-$C_3$-alkyl hydroxy-$C_1$-$C_3$-alkyl celluloses, such as carboxymethyl hydroxyethyl celluloses; $C_1$-$C_3$-alkyl celluloses, such as methylcelluloses; $C_1$-$C_3$-alkyl hydroxy-$C_{1-3}$-alkyl celluloses, such as hydroxyethyl methylcelluloses, hydroxypropyl methylcelluloses (HPMC) or ethyl hydroxyethyl celluloses; hydroxy-C1-3-alkyl celluloses, such as hydroxyethyl celluloses or hydroxypropyl celluloses (HPC); mixed hydroxy-$C_1$-$C_3$-alkyl celluloses, such as hydroxyethyl hydroxypropyl celluloses, mixed $C_1$-$C_3$-alkyl celluloses, such as methyl ethyl celluloses, or alkoxy hydroxyethyl hydroxypropyl celluloses, the alkoxy group being straight-chain or branched and containing 2 to 8 carbon atoms. The most preferred coatings are from HPC and/or HPMC.

Non-cellulosic coatings, such as poly(vinyl pyridine) are also suitable to apply the fluorescent material.

The coating may be applied as a solution or suspension. The process of preparing the coating solution differs, depending on which solution used to prepare it. For preparing solutions of hydroxypropylcellulose (HPC), commercially available as KLUCEL™ sold by Ashland Company or hydroxypropylmethylcellulose (HPMC) sold as HYPROMELLOSE™ by Dow Chemical Company, making an aqueous solution is typically a twostep process. The granulated HPC or HPMC is dispersed in water. After dispersion, the HPC or HPMC dissolves and forms a solution. The at least one fluorescent compound is added to the aqueous solutions. For HPC and HPMC, the celluloses both readily dissolve in polar solvents such alcohols. In a referred embodiment, the coating solution to the solid absorbent is applied in 1:3 to a 1:30 range. More preferably, the coating solution is added to the solid absorbent in a 1:4 to a 1:25 range.

The preferred concentration of the cellulose ester in the solution or suspension is in the range of from about 1 to 20 wt. %. The preferred cellulose ester for this coating is HPC which provides an effective coating that adheres, yet dries effectively.

Example of Hydroxypropyl Cellulose Coating Solution of Invention

The base Hydroxypropyl Cellulose (HPC) solution for dry coating was prepared as follows:

Hydroxypropyl Cellulose (HPC) 2% Solution

| Ingredient | Weight | % |
|---|---|---|
| purified water (Distilled) | 531.0000 | 88.50% |
| Hydroxypropyl Cellulose (Klucel EF Pharm) HPC ® | 12.0000 | 2.00% |
| Glycerin, USP 99.7% Excipient/Food use | 57.0000 | 9.50% |
| Total | 600 | 100 |

Method of Preparing HPC Solution:

1. Measure the glycerin into a silicone bowl.
2. Slowly stir in the HPC.
3. Whisk for 1 minute.
4. Whisk in the water.
5. Whisk for 5 minutes.

Example 1: Dry Coating Optical Brightener Powder Application Procedure

The dry optical brightener powder is KEYFLUOR™ WHITE OB sold by Millikin. The fluorescent compound present in the optical brightener is 2,2'-(2,5-thiophenediyl)-bis (5-tert-butylbenzoxazole), cas #7128-64-5 and is not water soluble. It is applied as a dry powder. The standard method for applying by atomizing the HPC coating in the coating tumbler is to layer the optical brightener powder with the HPC coating. The HPC solution wets the absorbent particles, allowing the dry brightener powder to adhere and coat. To achieve this, the process started by:

Step (1) with the coating tumbler running continuously at room temperature, dispense enough HPC Solution on the absorbent material using an atomizer in the coating tumbler to lightly wet the absorbent material. The absorbent material used was BOXIECAT® scent-free, premium clumping all natural clay cat litter. It has an extremely low dust content. It's made from pure, all natural clay, and contains no chemical additives.

Step (2) immediately adding a relatively small amount of the optical brightener powder to the wetted absorbent material in the coating bowl.

Step (3) spraying enough HPC solution onto the wetted absorbent and powder to allow the powder to adhere.

Step (4) allowing the solution to dry partially.

Step (5), repeating Steps (2) through (4) until all the optical brightener powder is added.

Step (6) adding the remaining solution quickly and apply heat as needed to dry the coating and finalize the coating as well as capture any remaining powder.

Example 1: Dry Coating Optical Brightener Powder Application

Coated BOXIECAT Cat Litter—1.78% Optical Brightener

| Ingredient | Weight | % |
|---|---|---|
| BOXIECAT ® cat litter absorbent | 4000.00 | 89.29% |
| HPC Solution, 2% | 400.04 | 8.93% |
| KEYFLUOR ™ WHITE OB Optical Brightener Dry Powder | 79.74 | 1.78% |
| Total | 4479.78 | 100 |
| Absorbent/HPC Solution = 10.0 | | |

Example 1—Results

The coated litter did not clump. It was coated evenly and maintained approximately its same shape and size. When the coating dried it adhered and did not flake off. The coated product uniformly glowed under UV light.

Example 2: Wet Coating Procedure

This procedure uses a water soluble optical brightener, Pylaklor White S-15A, which can be dissolved in the coating solution and applied in a liquid form. Pylaklor White S-15A is made by Pylam Dyes, and contains 4-(2H-Naphtho[1,2-d]triazol-2-yl)-2-stilbenesulfonic Acid Sodium Salt. The coating solution must be non-viscous enough to atomize and spray onto the solid particles. It must also contain enough cellulose to create stickiness and cause the coating to adhere to the particles when dried. It must contain enough optical brightener to be detectable under UV light.

| Example 2—The Coating Solution | % |
|---|---|
| purified water (Distilled) | 87.50% |
| Klucel EF Pharm HPC | 2.00% |
| Glycerin, USP 99.7% Excipient/Food use | 9.50% |
| Pylaklor White S-15A Optical Brightener | 1.00% |

| Example 2A—The Coating Solution | % |
|---|---|
| purified water (Distilled) | 87.30% |
| Klucel EF Pharm HPC | 2.00% |
| Glycerin, USP 99.7% Excipient/Food use | 9.50% |
| Pylaklor White S-15A Optical Brightener | 1.20% |

| Example 2B—The Coating Solution | % |
|---|---|
| purified water (Distilled) | 87.00% |
| Klucel EF Pharm HPC | 2.00% |
| Glycerin, USP 99.7% Excipient/Food use | 9.50% |
| Pylaklor White S-15A Optical Brightener | 1.50% |

Example 2 Procedure for Preparing the Coating Solution for Examples 2, 2A and 2B 1. The Glycerin was measured into a silicone bowl.
2. The Klucel HPC and Pylaklor Optical Brightener were added and stirred to form a mixture.
3. The mixture was whisked for for 1 minute.
4. The water was whisked into the mixture.
5. The mixture was whisked for 5 minutes to form the coating solution.

Example 2 Procedure for Applying the Coating Solution to the Absorbent Material

| Ingredient | Weight | % |
|---|---|---|
| Coating Solution—Example 2B | 675 | 13.04 |
| BOXIECAT Cat Litter Absorbent | 4500 | 86.96 |
| Absorbent/Coating Solution = 6.7 | | |
| Totals | 5175 | 100.000% |

Example 2 Procedure: Applying the Coating Solution to the Absorbent Cat Litter

The coating Solution must be added slowly and carefully so as to not create clumped coated litter. Step (1) with the coating tumbler running continuously at room temperature, dispense enough Coating Solution on the absorbent material using an atomizer into the coating tumbler to lightly wet the absorbent material. In a preferred method, from about 1 to 10 wt. % of the Coating Solution is administered at a time. The litter is carefully observed to not over-wet and cause clumping.

Step (2) allow enough time for the coating solution to dry, typically from about 0.3 to 3.0 minutes.

Step (3), repeat Steps (1) through (2) until all the Coating Solution is added.

Step (4) apply heat as needed to dry the coating and finalize the coating.

An alternative method to the above-described intermittent method is to very slowly and continuously add the Coating Solution. A way of accelerating the process is to add heat with a blower or other heat source.

Example 2 Results

The granulated cat litter coated with the Coating Solution was not clumped, but free flowing and approximately the same size and shape as the uncoated cat litter. It blended well with the uncoated litter in glowed when UV light was shined on it. The final coated product had about 0.20 wt. % fluorescent material.

Example 3—Coating the Absorbent—BOXIECAT

The Coating Solution Example 2A was applied to BOXIECAT cat litter absorbent following Example 2 procedure for adding the coating solution to the absorbent as follows:

Coating Solution Example 2A: 400.0 g
Absorbent, BOXIECAT Cat Litter: 4000.0 g
Absorbent/Coating Solution: 10
Results: The coated litter was granular and did not clump. The litter glowed when UV light was shined on it.

Example 4—Coating the Absorbent—BOXIECAT

The Coating Solution Example 2A was applied to BOXIECAT cat litter absorbent following Example 2 procedure for adding the coating solution to the absorbent as follows:

Coating Solution Example 2A: 200.0 g
Absorbent, BOXIECAT Cat Litter: 4147.0 g
Absorbent/Coating Solution: 20.7
Results: The coated litter was granular and did not clump. The litter glowed when UV light was shined on it.

Example 5—Coating the Absorbent—BOXIECAT

The Coating Solution of Example 2B applied to BOXIECAT cat litter absorbent following Example 2 procedure for adding the coating solution to the absorbent as follows:

Coating Solution Example 2A: 600.0 g
Absorbent, BOXIECAT Cat Litter: 4000.0 g
Absorbent/Coating Solution: 6.7
Results: The coated litter was granular and did not clump. The litter glowed when UV light was shined on it.

Example 6—Mixing the Coated Absorbent with Uncoated Absorbent—BOXIECAT

The coated litter of Example 5 was blended with BOXIECAT cat litter (uncoated) as follows:

Coated BOXIECAT cat litter Example 5: 720.0 g
Uncoated BOXIECAT cat litter: 3279.0 g
Uncoated/Coated: 4.55
Results: The two litters were dry mixed for about 10 minutes in the coating tumbler and inspected for even mixing. When UV light was shown on the mixture, the coated particles glowed. The materials did not segregate, but remained mixed evenly.

Example 7—Mixing the Coated Absorbent with Uncoated Absorbent—BOXIECAT

The coated litter of Example 4 was blended with BOXIECAT cat litter (uncoated) as follows:

Coated BOXIECAT cat litter Example 5: 1440.0 g—18%
Uncoated BOXIECAT cat litter: 6560.0.0 g—82%
Uncoated/Coated: 4.56

The two litters were dry mixed for about 10 minutes in the coating tumbler and inspected for even mixing. When UV light was shown on the mixture, the coated particles glowed. The materials did not segregate, but remained mixed evenly.

Example 8—Coating Sand

The Coating Solution of Example 2B was applied to untreated sand following Example 2 procedure for adding the coating solution to the absorbent as follows:

Coating Solution Example 2B: 74.98 g
Sand: 500.0 g
Sand/Coating Solution: 6.67
Results: The sand coated.

Example 9—Coating Particulate Zeolite

Zeolite was coated with the coating solution of the present invention.

The coated zeolite was blended with BOXIECAT cat litter, 1/20 mixture.

Example 10—Coating the Absorbent—SmartCat

The Coating Solution of Example 2B applied to Smartcat™ All-Natural Clumping Cat Litter, a chemical-free, biodegradable litter made from 100% USA farmed grass, sold by Pioneer Pet/Smartcat.

The procedure followed is Example 2 procedure for adding the coating solution to the absorbent as follows:

Coating Solution Example 2A: 40.6 g
Absorbent, BOXIECAT Cat Litter: 500.0 g
Absorbent/Coating Solution: 12.3
Results: The litter coated.

Example 11—Mixing the Coated Absorbent with Uncoated Absorbent—Smartcat

The coated litter of Example 10 was blended with Boxie cat litter (uncoated) as follows:

Coated Smartcat cat litter Example 10: 816.5 g—18%
Uncoated BOXIECAT cat litter: 3719.4 g—82%
Uncoated/Coated: 4.56
Results: The blend segregated.

Example 12—Coating the Absorbent—Ultra Micro Crystals Cat Litter™

The Coating Solution of Example 2B applied to Ultra Micro Crystals Cat Litter, a silica gel cat litter. The procedure followed is Example 2 procedure for adding the coating solution to the absorbent as follows:

Coating Solution Example 2B: 150 g
Absorbent, BOXIECAT Cat Litter: 1000.0 g
Absorbent/Coating Solution: 6.7
Results: The coated litter did not clumped and was evenly coated.

Example 13—Mixing the Coated Absorbent with Uncoated Absorbent—Ultra Micro Crystals The coated litter of Example 12 was blended with Boxie cat litter (uncoated) as follows:

Coated Ultra Micro Crystals: 5 wt. %
BOXIECAT uncoated: 95 wt. %
Absorbent/Coated Absorbent: 19
Results: The coated particles in the mixed litter glowed when UV light was shining on it.

This invention further includes, in addition to the at least one fluorescent compound, other additives such as antimicrobials and antifungals, suitable for cat litter products. Such additional additives are disclosed in U.S. Pat. No. 9,266,089, which is hereby incorporated by reference.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A cat litter comprising at least one dry, solid absorbent material and at least one fluorescent compound, wherein the at least one fluorescent compound does not contain cat urine;
wherein the at least one fluorescent compound is applied as a coating onto the at least one dry, solid absorbent material to form a coated particulate material;
wherein the coating adheres to the solid absorbent material;
wherein the cat litter visibly fluoresces ultraviolet, white, or blue light alone or in combination when an ultraviolet light shines on the cat litter; and
wherein the cat litter is visually attractive to cats.

2. The cat litter of claim 1, wherein the at least one fluorescent compound comprises anionic diamino stilbene (DAS) or distyryl biphenyl (DSBP) derivatives.

3. The cat litter of claim 1, wherein the at least one fluorescent compound is selected from the group consisting of 2,2'-(2,5-thiophenediyl)-bis (5-tert-butylbenzoxazole), 4-(2H-Naphtho[1,2-d]triazol-2-yl)-2-stilbenesulfonic Acid Sodium Salt, 4,4'-bis(benzoxazolyl)-cis-stilbene, 2,2'-(2,5-thiophenediyl)-bis (5-tert-butylbenzoxazole), and combinations thereof.

4. The cat litter of claim 1, wherein the at least one dry, solid absorbent material comprises sodium bentonite.

5. A method of making a cat litter comprising applying a coating a on an absorbent dry particulate material comprising the steps:
(a) dispensing a cellulose solution onto a dry particulate material to wet the absorbent dry particulate material and form a wetted particulate material;
(b) adding a dry fluorescent compound to the wetted particulate material;
(c) spraying the cellulose solution onto the wetted particulate material and the dry fluorescent compound to form the coating wherein the dry fluorescent compound adheres to the wetted particulate material;
(d) allowing the cellulose solution to dry;
(e) repeating Steps (b) through (d); and
(f) applying heat to the coating to dry and make the cat litter;
wherein the cat litter visibly fluoresces ultraviolet, white, or blue light alone or in combination when an ultraviolet light shines on the cat litter; and
wherein the cat litter is visually attractive to cats.

6. The method of making a cat litter of claim 1, where the absorbent dry particulate material comprises sodium bentonite.

7. The method of making a cat litter of claim 6, wherein the cellulose solution is a hydroxypropyl cellulose solution.

8. The method of claim 7, wherein the dry fluorescent compound is selected from the group consisting of 2,2'-(2,5-thiophenediyl)-bis (5-tert-butylbenzoxazole), and 4-(2H-Naphtho[1,2-d]triazol-2-yl)-2-stilbenesulfonic Acid Sodium Salt.

9. A method of making a cat litter comprising applying a coating to an absorbent dry particulate material comprising;
adding a coating solution onto a dry particulate material to wet the dry particulate material, thereby forming a coating on the dry particulate material and forming a wetted coated particulate material;
wherein the wetted coated particulate material does not clump; and
wherein the coating solution contains a fluorescent compound;
allowing the wetted coated particulate material to dry to form a dried coated particulate material;
wherein the coating adheres to the dried coated particulate material;
wherein the dried coated particulate material is not in clumps;
wherein the dried coated particulate material is the cat litter;
wherein the cat litter visibly fluoresces ultraviolet, white, or blue light alone or in combination when an ultraviolet light shines on it; and
wherein the cat litter is visually attractive to cats.

10. The method of claim 9, wherein the coating solution comprises a cellulose solution.

11. The method of claim 10 wherein the cellulose solution is a hydroxypropyl cellulose solution.

12. The method of making a cat litter of claim 9, where the absorbent dry particulate material comprises sodium bentonite.

13. The method of claim 11, wherein the absorbent dry particulate material is selected from the group consisting of clays, silica gels, woods, agricultural products, and combinations thereof.

14. The method of claim 9, wherein the fluorescent compound is selected from the group consisting of 2,2'-(2,5-thiophenediyl)-bis (5-tert-butylbenzoxazole), and 4-(2H-Naphtho[1,2-d]triazol-2-yl)-2-stilbenesulfonic Acid Sodium Salt.

15. The method of claim 14, further comprising:
wherein the weight of coating solution to the weight of solid absorbent dry particulate material is in a range of from 1:3 to a 1:30;

wherein the coating solution contains in the range of from 1 wt. % to 20 wt. % hydroxypropyl cellulose; and wherein the coating solution contains from about 0 to 5 wt. % glycerin.

16. The cat litter of claim 1, wherein the coating further comprises a cellulosic material; and wherein the coated particulate material is not clumped together.

17. The cat litter of claim 16, wherein the dry, solid absorbent material is selected from the group consisting of clays, silica gels, woods, agricultural products, and combinations thereof;

wherein the cellulosic material is hydroxypropyl cellulose; and wherein the at least one fluorescent compound is selected from the group consisting of 2,2'-(2,5-thiophenediyl)-bis (5-tert-butylbenzoxazole), 4-(2H-Naphtho[1,2-d] triazol-2-yl)-2-stilbenesulfonic Acid Sodium Salt, 4,4'-bis(benzoxazolyl)-cis-stilbene, 2,2'-(2,5-thiophenediyl)-bis (5-tert-butylbenzoxazole), and combinations thereof.

18. The cat litter of claim 17, wherein the amount of hydroxypropyl cellulose in the cat litter is in the range of 0.01 wt. % to 10.0 wt. %, and the amount of the at least one fluorescent compound is present in the range of about 0.01 wt. % to 10.0 wt. %.

19. The cat litter of claim 18, wherein the cat litter is mixed with a dry absorbent material to make a cat litter.

20. The cat litter of claim 16, wherein the dry particulate material comprises sodium bentonite.

* * * * *